United States Patent [19]
Halaunbrenner

[11] 3,741,159
[45] June 26, 1973

[54] CAGE FOR BREEDING SHELLFISH
[76] Inventor: Lazare Nathan Halaunbrenner, 17 bd. Edgar Quinet, Colombres, France
[22] Filed: July 30, 1971
[21] Appl. No.: 167,710

[30] Foreign Application Priority Data
Aug. 12, 1970 France.............................7029710

[52] U.S. Cl......................................... 119/4, 119/2
[51] Int. Cl............................................. A01k 61/00
[58] Field of Search..................................... 119/4, 2

[56] References Cited
UNITED STATES PATENTS
2,989,945   6/1961   Ford ...................................... 119/4
239,592   3/1881   Weems ................................... 119/4
1,815,521   7/1931   Miyagi..................................... 119/4
3,316,881   5/1967   Fischer ................................... 119/4
3,556,052   1/1971   Blount..................................... 119/4

Primary Examiner—Aldrich F. Medbery
Attorney—Holcombe, Wetherill & Brisebois

[57] ABSTRACT

Float-equipped cage for shell-fish comprises a basket-like receptacle incorporating a float and means for attaching a line at the bottom thereof.

34 Claims, 8 Drawing Figures

PATENTED JUN 26 1973    3,741,159

PATENTED JUN 26 1973 3,741,159
SHEET 2 OF 2
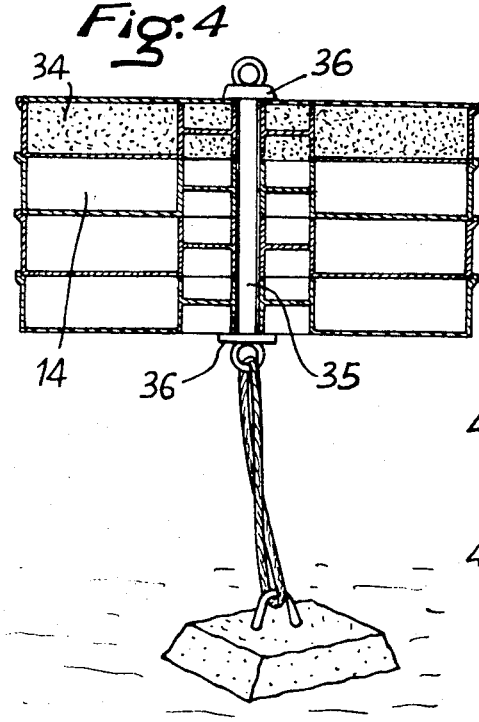
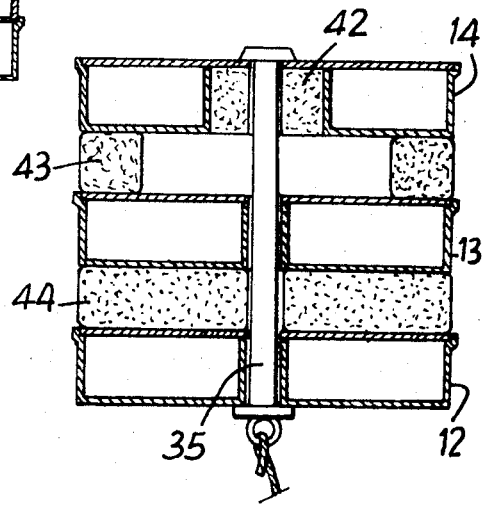
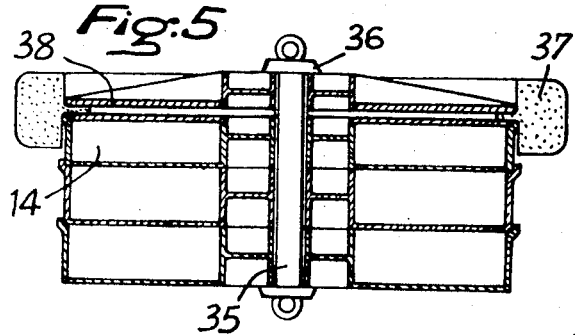
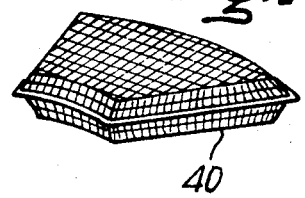
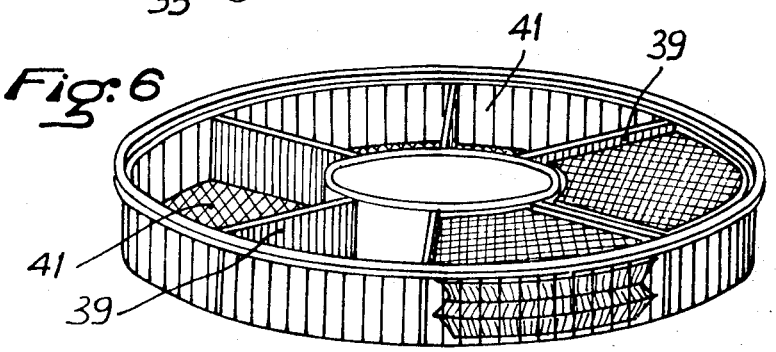

CAGE FOR BREEDING SHELLFISH

The present invention relates to a cage for breeding shellfish and in particular although not exclusively for breeding oysters or mussels.

Those skilled in the art will be aware that the breeding of shellfish is conventionally carried out in beds in shallow sea areas, uncovered at low tide and delimited by barriers generally in the form of stakes or netting, which isolate the shellfish and protect them against predators.

This traditional method has the drawback that not only is it relatively laboring but it can only be put into practice in locations where the water depth is suitable.

The present invention relates to a cage which does duty as a unit for the breeding or storing of shellfish. This unit is closed thus protecting the shellfish against their natural enemies; moreover, it is equipped with a float and can be immersed to the requisite depth, whatever the depth of the seabed.

The float-equipped cage in accordance with the invention also, thanks to its lightweight structure, enables a brood or spat (that is to say shellfish in the early stages of development) to be collected and reared.

According to the present invention therefore a float-equipped cage for breeding or storing shellfish comprises a closed basket-like receptacle provided with a float, and provided with means for attaching a cable or rope to a lower portion in order to immerse the cage at a suitable depth by attachment to a locating device on a seabed.

In a first, preferred embodiment the cage comprises a central float constituted by a sealed volume of preferably cylindrical form and at least one annular receptacle in the form of a basket arranged on the periphery of the float and provided with a cover.

In a second embodiment, the float-equipped cage comprises an upper float constituted by a flat watertight volume, and at least one annular or circular basket-like receptacle, said upper float abutting upon the top face of said receptacle.

In another embodiment, the cage comprises an annular peripheral float constituted by a watertight volume, and at least one annular or circular receptacle of basket form surrounded by said float.

In yet another embodiment, the cage comprises at least one annular or circular receptacle of basket form equipped with a cover and at least one float, the latter being enclosed in said basket.

The annular basket-like receptacle may be produced by moulding in plastic material, said receptacles containing in at least certain of their surfaces openings which are adequate to allow the passage of water but do not allow passage of shellfish or their natural predators.

If desired several annular receptacles can be arranged one on top of the other and thus annular baskets may be placed upon one float the stacking arrangement being such that the base of one basket forms the cover of the basket immediately beneath it.

The invention also includes a method of collecting a brood or spat and/or breeding shellfish which includes immersing a float equipped cage as set forth between two tides at a suitable depth, by connecting it through a cable or rope of suitable length to a sinker resting on the seabed.

The invention may be performed in various ways and some embodiments will now be described by way of example and with reference to the accompanying drawings in which:

FIG. 4 illustrates another embodiment of the invention, in axial section;

FIG. 5 is an axial section of another embodiment;

FIG. 6 is a perspective view of a basket without its cover, in accordance with another embodiment;

FIG. 7 is a perspective view of a brood or spat pot for use with the basket shown in FIG. 6, and FIG. 8 illustrates a sectional view through a cage in accordance with another embodiment.

Figure 1:
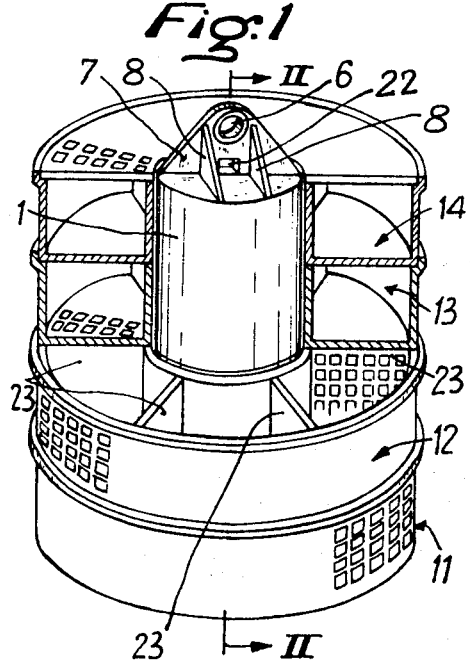
FIG. 1 shows a schematic, perspective, partially sectional view of a float-equipped cage in accordance with the invention.
Figure 2:
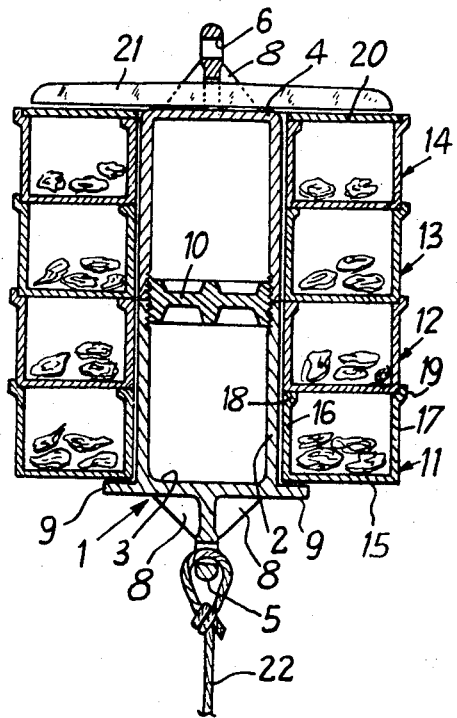
FIG. 2 is a sectional view on the line II—II of FIG. 1.

As shown in FIGS. 1 and 2 a central float is indicated by reference numeral 1 and has a generally cylindrical form defined by a lateral envelope 2 and two bases 3 and 4 each carrying a ring 5, 6 attached to the corresponding base by ribs 7 and 8.

In the embodiment illustrated in section in FIG. 2, the base 3 of the float 1 extends at its external periphery, beyond the cylindrical wall 2 in the form of a flange 9 acting as a stop for annular baskets which are arranged on the float and which are to be described.

The body of float 1 is made in two parts of, for example, injection-molded plastic material interconnected by an intermediate component 10 which is both screwed and stuck in a watertight fashion to the top and bottom parts.

In this manner, a hollow body is readily obtained which can do duty as the float.

In the embodiment shown in FIGS. 1 and 2, the cage comprises four superimposed annular baskets. These baskets 11, 12, 13 and 14 are identical in the present case but could equally well be different from one another. For example, they could have different heights, it being understood of course however that it is preferable that the sum of the heights of the baskets arranged on the float should correspond to the overall float height.

It is also possible, however, to provide around the float a smaller number of baskets in order to leave the top part of the float without a basket thus lowering the center of gravity and ensuring improved stability.

Each basket has a base 15 in the form of a circular ring connected to an internal cylindrical wall 16 and an external cylindrical wall 17.

The internal cylindrical wall 16 has a flange 18 or vertical ribs extending radially at various points, in order to provide a means of support for the basket located immediately above and in order to facilitate proper distribution of the shellfish. Similarly, the external cylindrical wall 17 terminates at the flange 19 which locates the basket above it.

A top cover 20 is provided in the form of an annular ring which is fixed in position by a pin or bolt 21 which is located on the top part of the float 1 in an opening 22 in the rib 7.

It is a straightforward matter to arranged around the float a succession of annular baskets which have previously been filled with produce which are to be held under water. Once the appropriate number of baskets has been arranged on the float, it is merely necessary to place the cover 20 in position and block it with the pin 21.

The depth of the float-equipped basket in accordance with the invention is determined by attaching a cable or rope 22 which is fitted with a sinker at its other end and whose length corresponds to to the height at which the basket is to be moored above the seabed.

In order for the cage to float between two tides, it is advisable to arrange the volume of the float as a function of the weight of the overall assembly in order that the latter complete with the shellfish it holds, has sufficient buoyancy to exert a pull upon the cable 22.

As shown in FIG. 1 the cylindrical internal partitions 16 and the cylindrical external partitions 17 of each basket are interconnected by radial partitions 23 which form compartments inside the baskets and contribute to each basket's rigidity whilst preventing the shellfish from piling up together should the basket tilt.

If desired it is possible to arrange a mesh upon the base of each basket or upon the base of the compartments thereof to collect the waste products produced by a shellfish. This mesh can easily be exchanged when the batch of shellfish contained in the basket is changed. Again, the bases of the baskets can be constituted by a mesh surface which is supported by bars or other supports located at intervals.

In order not to overburden the drawing, the openings formed in the various walls of the baskets have only actually been shown at restricted locations but openings are much more numerous than the illustration would suggest and are distributed over the set of walls although it is not essential for openings to be formed in the internal cylindrical wall which is arranged against the wall of the float 1.

These openings can have arbitrary shapes and sizes as long as they provide an efficient barrier to the shellfish and to their predators.

Figure 3:
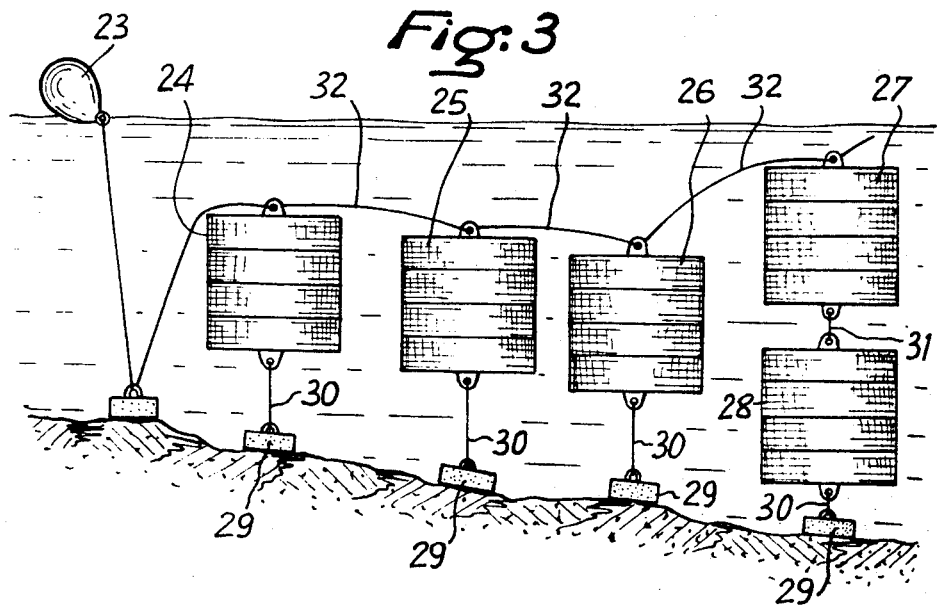
FIG. 3 is a schematic view of float-equipped cages in accordance with the invention which, in use, are arranged upon the seabed at progressively increasing depths.

A schematic illustration is shown in FIG. 3 indicating how cages 24, 25, 26, 27, and 28 can be arranged upon a seabed.

To this end the baskets 24, 25 and 26 are each attached to a sinker 29 through a cable or rope 30 of appropriate length so that the baskets are immersed at substantially the same depth.

As far as the baskets 27 and 28 are concerned, an arrangement has been shown which can advantageously be employed in cases where the seabed is at a much greater depth. In this case, too, baskets 27 and 28 are attached to one another by a cable 31 whilst the bottom basket is attached to the sinker 29 through a cable 30 so that where the depth of the seabed permits, a certain number of cages can be arranged in a superimposed disposition.

A cable or rope 32 can be used to attach the top parts of different baskets together, in order to be able to lift them more easily once one of them has been brought to be surface, something which can very easily be carried out in fact by attaching one of the baskets to a cable connected to a marker buoy 33.

In another embodiment shown in FIG. 4, a flat float 34, for example made of a buoyant material foamed plastic or the like, is attached to the upper part of a basket 14. The float 34 rests upon the top face or cover of the basket 14 against which it is held by a rod 35 with attachment collars 36, the rod 35 being secured by a cable to a sinker.

In FIG. 5, another embodiment is shown in which an annular float 37 is attached to a basket 14 which it surrounds, by a cheekplate 38 located by a rod 35 which a collar 36.

In FIG. 6, a basket in accordance with the invention, with a plurality of radial partitions 39 which separate brood or spat pots 40 is shown. The radial partitions 39 also serve to improve the rigidity and crushing strength of the basket and to facilitate the distribution of the shellfish. A basket of this kind can be given buoyancy by arranging floats of circular sector form similar in shape to the brood or spat pots 40 in certain of the compartments 41 formed by said partitions 39. These floats are retained in the basket by the cover or by the superimposition of a second basket.

The compartments 41, can also carry brood or spat collectors of curved form, constituted for example by sheet metal or plastic mesh, possibly coated with a layer of lime to fix the brood. These collectors are maintained in the curved condition in the compartments 41, and when the brood or spat is collected they are removed from the compartments 41 and the brood removed by distorting the collectors.

The brood can then be introduced into cages like those shown in the preceding figures, for rearing.

Referring to FIG. 8, a cage comprising three baskets 12, 13 and 14 superimposed upon one another and interconnected via a rod 35 is shown. Inside the basket 14, and held in position by the cover thereof, there is a cylindrical float 42 centrally arranged around the rod 35. Above basket 13 there is a float of foamed material 43 having an annular form and arranged in the periphery of the basket 13 and in the basket 12 below there is a float of foam material 44 constituted by a disc which is pieced to allow passage of rod 35.

The cages which have just been described, and their accessories, are manufactured of plastics or synthetic materials which can be injection-moulded or moulded by other techniques. For example, polyethylene, polypropylene, polyvinylchloride, polyamide or even thermosetting materials such as those known as "bakelite" or again urea/formol resins, can be used, although this list is in no way intended to be limitative of the scope of the invention.

In accordance with a preferred embodiment of the invention, there will be associated with the plastic or synthetic materials used, at least one metal which is effective in fixing the larvae and/or developing the shellfish. Such metals are for example copper, iron or manganese. They may be present in the form of the pure metal, in the form of alloys with other metals, or in the form of chemical compounds containing the metals.

In particular where the cages and their accessories are intended for the breeding of oysters, it is desirable to introduce into the plastic or synthetic material pure copper or copper alloy (for example with brass or bronze), or again copper in the form of copper-base chemical compounds such as copper sulphate or copper phosphate.

The introduction of these metals into the plastic or synthetic materials is preferably effected in powder or particulate form prior to the conversion of the plastic or synthetic material in the course of manufacture of the cages in accordance with the invention.

The proportion of metal in the plastic or synthetic material can vary within very wide limits for example between 0.01 and 50 percent more particularly 0.1 and 10 percent and preferably 1 and 3 percent by weight, of metal.

Cages in accordance with the invention have been found particularly useful for the collection, breeding and storing of shellfish, if they contain between 1 and 3 percent of metallic copper.

What I claim as my invention and desired to secure by Letters Patent of the United States:

1. A float-equipped cage for shell-fish comprising a central float defining a sealed volume and at least one annular closed basket-like receptacle on the periphery of the float, for said basket, and means for attaching a line to a lower portion of said float.

2. A float-equipped cage as claimed in claim 1, in which the central float defines a closed cylindrical volume and is provided with a ring at each end.

3. A float-equipped cage as claimed in claim 1 in which the float comprises two moulded plastic parts which are attached to one another.

4. A float-equipped cage as claimed in claim 1 in which the annular receptacle is interlocked with the float.

5. A float-equipped cage for shell-fish comprising an upper float defining a flat watertight volume, and at least one circular basket-like receptacle, said upper float abutting upon the top face of said receptacle, and said cage being provided with means for attaching a line to a lower portion thereof.

6. A float-equipped cage for shell-fish comprising an annular peripheral float defining a watertight volume, and at least one circular closed basket-like receptacle surrounded by said float, said cage being provided with means for attaching a line to a lower portion thereof.

7. A float-equipped cage for shell-fish comprising at least one circular receptacle of basket form equipped with a cover, and at least one float defining a watertight volume enclosed within said basket, said cage being provided with means for attaching a line to a lower portion thereof.

8. A cage as claimed in claim 7 in which the enclosed float has a cylindrical annular form, with a central orifice.

9. A float-equipped cage as claimed in claim 7 in which several floats of circular sector form are provided.

10. A float-equipped cage as claimed in claim 1 including several annular receptacles arranged one on top of the other.

11. A float-equipped cage as claimed in claim 10, in which the base of one annular receptacle forms the cover of the underlying annular receptacle immediately beneath it.

12. A float-equipped cage as claimed in claim 1 in which the receptacle is closed at its upper end by a cover which is held in position by a pin engaging in an opening formed in the top part of the float.

13. A float-equipped cage as claimed in claim 1 made of a synthetic material containing an exposed metal which is effective in the collection and development of shell-fish.

14. A float-equipped cage as claimed in claim 13 in which said metal is selected from the group consisting of copper, iron and manganese.

15. A float-equipped cage as claimed in claim 14 in which said metal is present in proportions ranging between 0.01 and 50 percent.

16. A float-equipped cage as claimed in claim 5 wherein said circular basket-like receptacle has an annular form.

17. A float-equipped cage as claimed in claim 5 including several receptacles arranged one on top of the other.

18. A float-equipped cage as claimed in claim 17 in which the base of one receptacle forms the cover of the underlying receptacle immediately beneath it.

19. A float-equipped cage as claimed in claim 5 made of synthetic material, said synthetic material containing an exposed metal which is effective in the collection and development of the shellfish.

20. A float-equipped cage as claimed in claim 19, in which said metal is selected from the group consisting of copper, iron and manganese.

21. A float-equipped cage as claimed in claim 20 in which said metal is present in a proportion ranging between 0.01 and 50 percent by weight.

22. A float-equipped cage as claimed in claim 7 wherein said receptacle has an annular form.

23. A float-equipped cage as claimed in claim 7 including several receptacles arranged one on top of the other.

24. A float-equipped cage as claimed in claim 23 in which a base of one receptacle forms the cover of the underlying receptacle immediately beneath it.

25. A float-equipped cage as claimed in claim 7 in which the receptacle is closed off at its upper end by a cover which is held in position by a pin engaging in an opening formed in a top part of the float.

26. A float-equipped cage as claimed in claim 7 made of synthetic material, said synthetic material containing a metal which is effective in the collection and development of the shell-fish.

27. A float-equipped cage as claimed in claim 26 in which said metal is selected from the group consisting of copper, iron and manganese.

28. A float-equipped cage as claimed in claim 27 in which said metal is present in proportions ranging between 0.01 and 50 percent by weight.

29. A float-equipped cage for shell-fish comprising a closed basket-like receptacle, a float engaging said receptacle and firmly held against said receptacle, and means for attaching a line to a lower portion thereof, wherein said cage is made of synthetic material, said synthetic material containing exposed particles of metal which are effective in the collection and development of the shell-fish.

30. A float-equipped cage as claimed in claim 29 in which said metal is selected from the group consisting of copper, iron and manganese.

31. A float-equipped cage as claimed in claim 29 wherein said metal is present in a proportion ranging between 0.01 and 50 percent by weight.

32. A float-equipped cage as claimed in claim 31 wherein said metal is present in a proportion ranging between 0.1 and 10 percent by weight.

33. A float-equipped cage as claimed in claim 32 wherein said metal is present in a proportion ranging between 1 and 3 percent by weight.

34. A float-equipped cage as claimed in claim 33 wherein said synthetic material is selected from the group consisting of polyethylene, polypropylene, polyvinylchloride, polyamide, thermosetting resin, phenol/formaldehyde, and urea/formol resin.

* * * * *

UNITED STATES PATENT OFFICE
CERTIFICATE OF CORRECTION

Patent No. 3,741,159      Dated June 26, 1973

Inventor(s) LAZARE NATHAN HALAUNBRENNER

It is certified that error appears in the above-identified patent and that said Letters Patent are hereby corrected as shown below:

Column 5, line 15 should read as follows:

"of the float, a cover for said basket, and means for attaching a"

Signed and sealed this 20th day of August 1974.

(SEAL)
Attest:

McCOY M. GIBSON, JR.      C. MARSHALL DANN
Attesting Officer      Commissioner of Patents